Patented Feb. 27, 1945

2,370,525

UNITED STATES PATENT OFFICE 2,370,525

PURIFICATION OF TITANIUM TETRACHLORIDE

Bernard De Witt, Akron, Ohio, assignor to Pittsburgh Plate Glass Company, Pittsburgh, Pa., a corporation of Pennsylvania No Drawing. Application November 16, 1942, Serial No. 465,799

9 Claims. (Cl. 23—87)

The present invention relates to the preparation of tetrahalides of metals of the fourth group of elements and more particularly to the purification of titanium tetrachloride and similar stable, normally liquid, distillable tetrahalides.

One object of this invention is to provide a process of removing impurities from a liquid tetrahalide of a metal of the fourth group of elements by a simplified treatment thereof with hydrogen sulfide.

The second object of the invention is to provide a purification process wherein a selected group of additive compounds facilitates the conversion of soluble chloride impurities into insoluble sulfide impurities.

Other objects and advantages of my invention will become more apparent from the following detailed description of certain preferred embodiments thereof.

The production of tetrahalides of metals of the fourth group of elements generally results in their recovery in an impure form. For example, titanium tetrachloride prepared by the chlorination of ilmenite or other titanic ore usually contains chlorides of vanadium, iron, molybdenum, and possibly other unidentified impurities. Stannic chloride prepared by the chlorination of tin ores or tin alloys often contains chlorides of arsenic and antimony and frequently chlorides of vanadium. Silicon tetrachloride and germanium tetrachloride are similarly contaminated. The impurities are generally present in very small concentrations, usually from about 0.01 to 0.1 per cent by weight of the tetrachloride, and are rarely present in concentrations above about 5 percent by weight of the tetrachloride.

I am aware that it has hitherto been proposed to purify titanium tetrachloride and other tetrahalides of a similar nature by treatment with hydrogen sulfide but such processes have involved considerable difficulties. For example, in order to insure proper reaction of the hydrogen sulfide with the titanium tetrachloride it is generally necessary to disperse the titanium tetrachloride as a thin film and to contact the film with gaseous hydrogen sulfide.

Briefly stated the present invention contemplates the addition of a small quantity of a heavy metal salt of a higher organic acid to the tetrahalide solution in order to promote the reaction of hydrogen sulfide therewith.

Treatment of a tetrahalide of a metal of the fourth group of elements containing a small amount of a heavy metal soap with hydrogen sulfide causes precipitation of a major portion of the metallic impurities contained therein. A large portion of the vanadium is removed in this manner. Other metals, such as arsenic, antimony and molybdenum, will be precipitated to a substantial degree, if such materials are present. It is possible that a small amount of the metallic tetrahalide undergoing purification will be precipitated at the same time, but in general the treatment is discontinued before this removal is effected to any considerable degree.

It has been found that the presence of a small amount of a heavy metal soap increases the rate of formation of a precipitate in the liquid halide undergoing treatment with hydrogen sulfide and this heavier initial precipitate of the metallic impurities absorbs or adsorbs other impurities, facilitating a more complete purification of the liquid halide.

A small quantity of the heavy metal soap, such as ferric stearate, nickel stearate, cobalt stearate, cupric or cuprous stearate, or the corresponding laurates, linoleates, oleates, palmitates, etc., is dissolved in the liquid halide and hydrogen sulfide is contacted with the resulting solution. A precipitate results almost immediately. This precipitate consists of the sulfides of any metallic impurities present in the liquid halide, the sulfide of the metallic element of the soap, and at times a small amount of the sulfide of the liquid halide undergoing treatment.

The precipitate may be removed from the liquid halide by decantation or filtration, or the liquid may be distilled from the precipitate. Subsequent distillation, although not essential, does result in a further purification of the liquid halide. While the exact nature of the reaction which takes place is not known, it is believed that those impurities which are precipitated are converted into compounds of higher boiling points, permitting separation by distillation.

Preferably the process is conducted at ordinary temperatures in the bulk liquid phase for simplicity of operation. Hydrogen sulfide is merely bubbled through a large volume of liquid tetrahalide in which has been dissolved from 0.05–0.5 percent by weight of a heavy metal soap. When the rate of formation of a precipitate has decreased appreciably, the flow of hydrogen sulfide is stopped and the liquid tetrahalide is decanted from the container or otherwise separated from the precipitate.

If it is desired the liquid halide solution containing the heavy metal soap may be percolated through a column packed with a porous bed of solid particles while a stream of gaseous hydrogen sulfide is passed counter-currently therethrough. The treated liquid is collected at the base of the tower in a suitable container and separated from the precipitated impurities.

The process is generally conducted in the substantial absence of chlorine, hydrogen chloride or water vapor in order to avoid additional reactions and possible destruction of the treating agents. Thus it will be apparent that the liquid undergoing treatment is substantially anhydrous. The residual liquid halide after separation from the precipitate may be treated with inert gases to remove excess hydrogen sulfide retained therein or may be subjected to the action of sulfur dioxide.

The following examples are illustrative of my invention:

Example I

One liter of anhydrous titanium tetrachloride containing 0.072% of vanadium was mixed with 0.5 gms. of ferric stearate. A stream of gaseous hydrogen sulfide was passed through the solution and a heavy brownish black precipitate resulted. The liquid titanium tetrachloride was separated from this precipitate and found to contain only 0.0002% of vanadium. Some color was present in the purified tetrachloride but this was removed by distillation.

Example II

Three grams of cupric stearate was dissolved in one liter of anhydrous titanium tetrachloride containing 0.074% of vanadium. A stream of gaseous hydrogen sulfide was passed through the solution until the formation of appreciable quantities of a precipitate ceased. The titanium tetrachloride recovered contained only 0.0002% of vanadium.

Example III

Nickel palmitate (0.5% by weight) was dissolved in impure anhydrous stannic chloride having a distinct yellow color. Gaseous hydrogen sulfide was passed through the solution resulting in the formation of a slight precipitate. Distillation of the solution yielded water-white stannic chloride.

While the invention is particularly directed to the purification of titanium tetrachloride, it may be applied with equal effect to other titanium tetrahalides, such as titanium tertabromide or titanium tetrafluoride, or other metallic liquid halides, such as stannic chloride, germanium tetrachloride, or the corresponding liquid bromides, fluorides, and iodides or silicon, tin, arsenic, or germanium.

It will at once be obvious that various modifications of the process and the materials undergoing treatment are possible without departing from the inventive concept as set forth in the accompanying claims.

What I claim is:

1. A process of purifying a substantially anhydrous liquid halide of a metal of the fourth group of elements which comprises dissolving a heavy metal soap therein and subjecting the liquid to the action of hydrogen sulfide.

2. A process of purifying a substantially anhydrous liquid chloride of a metal of the fourth group of elements which comprises dissolving a small quantity of a heavy metal soap therein and subjecting the liquid to the action of hydrogen sulfide.

3. A process of purifying a substantially anhydrous liquid chloride of a metal of the fourth group of elements which comprises dissolving from 0.05–0.5% by weight of a heavy metal soap therein and subjecting the liquid to the action of hydrogen sulfide.

4. A process of purifying a substantially anhydrous liquid chloride of a metal of the fourth group of elements which comprises dissolving from 0.05–0.5% by weight of a heavy metal soap therein, subjecting the liquid to the action of hydrogen sulfide to form a precipitate, and separating the precipitate from the liquid.

5. A process of purifying substantially anhydrous titanium tetrachloride which comprises dissolving a small amount of a heavy metal soap therein, subjecting the liquid to the action of hydrogen sulfide to form a precipitate, and separating the precipitate from the liquid.

6. A process of purifying substantially anhydrous titanium tetrachloride which comprises dissolving from 0.05–0.5% by weight of a heavy metal soap therein, subjecting the liquid to the action of hydrogen sulfide and separating the precipitate from the liquid.

7. A process of purifying substantially anhydrous titanium tetrachloride which comprises dissolving from 0.05–0.5% by weight of ferrous stearate therein, subjecting the liquid to the action of hydrogen sulfide, and separating the precipitate from the liquid.

8. A process of purifying substantially anhydrous titanium tetrachloride which comprises dissolving from 0.05–0.5% by weight of cupric stearate therein, subjecting the liquid to the action of hydrogen sulfide, and separating the precipitate from the liquid.

9. A process of purifying substantially anhydrous titanium tetrachloride which comprises dissolving from 0.05–0.5% by weight of nickel palmitate therein, subjecting the liquid to the action of hydrogen sulfide, and separating the precipitate from the liquid.

BERNARD DE WITT.